US010132965B2

(12) United States Patent
Baleine et al.

(10) Patent No.: US 10,132,965 B2
(45) Date of Patent: Nov. 20, 2018

(54) OPTICAL APPARATUS AND METHOD OF FORMING A GRADIENT INDEX DEVICE

(71) Applicants: LOCKHEED MARTIN CORPORATION, Bethesda, MD (US); THE PENN STATE RESEARCH FOUNDATION, University Park, PA (US); CLEMSON UNIVERSITY RESEARCH FOUNDATION, Clemson, SC (US)

(72) Inventors: Clara Rivero Baleine, Orlando, FL (US); Theresa S. Mayer, Port Matilda, PA (US); Jonathan David Musgraves, Anderson, SC (US); Kathleen Richardson, Geneva, FL (US); Peter Wachtel, Anderson, SC (US)

(73) Assignees: Lockheed Martin Corporation, Bethesda, MD (US); The Penn State Research Foundation, University Park, PA (US); Clemson University Research Foundation, Clemson, SC (US)

( * ) Notice: Subject to any disclaimer, the term of this patent is extended or adjusted under 35 U.S.C. 154(b) by 207 days.

(21) Appl. No.: 15/135,813

(22) Filed: Apr. 22, 2016

(65) Prior Publication Data

US 2016/0238746 A1    Aug. 18, 2016

Related U.S. Application Data

(62) Division of application No. 14/172,175, filed on Feb. 4, 2014, now Pat. No. 9,340,446.
(Continued)

(51) Int. Cl.
*G02B 3/00* (2006.01)
*C03C 4/00* (2006.01)
(Continued)

(52) U.S. Cl.
CPC ............ *G02B 3/0087* (2013.01); *C03B 25/00* (2013.01); *C03B 32/02* (2013.01); *C03C 3/321* (2013.01);
(Continued)

(58) Field of Classification Search
CPC ......... C03B 25/00; C03B 32/02; C03C 3/321; C03C 4/0028; C03C 10/00;
(Continued)

(56) References Cited

U.S. PATENT DOCUMENTS

| 3,362,797 A | 1/1968 | Shaskolskaja et al. |
| 3,825,317 A | 7/1974 | Inoue et al. |

(Continued)

OTHER PUBLICATIONS

Notice of Allowance for U.S. Appl. No. 14/957,671, dated Jun. 23, 2017, 8 pages.
(Continued)

*Primary Examiner* — Queenie S Dehghan
(74) *Attorney, Agent, or Firm* — Withrow & Terranova, PLLC

(57) ABSTRACT

A refractive index device and method of making it include obtaining a glass structure comprising a plurality of nucleation sites. The glass structure is formed from a glass composition that comprises a first chemical component and a second chemical component. A crystal of the second chemical component has a different second refractive index from a first refractive index of the first chemical component. Each nucleation site defines where a crystal of the second chemical component can be grown. The method includes causing crystals of the second chemical component to grow in situ at a set of the plurality of nucleation sites in order to produce a spatial gradient of a refractive index in the glass structure.

19 Claims, 10 Drawing Sheets

Related U.S. Application Data

(60) Provisional application No. 61/760,284, filed on Feb. 4, 2013.

(51) Int. Cl.

| | |
|---|---|
| *C03C 23/00* | (2006.01) |
| *C03B 32/02* | (2006.01) |
| *G02B 1/02* | (2006.01) |
| *C03B 25/00* | (2006.01) |
| *C03C 3/32* | (2006.01) |
| *C03C 10/00* | (2006.01) |
| *G02B 6/12* | (2006.01) |
| *G02B 6/10* | (2006.01) |

(52) U.S. Cl.
CPC ............ *C03C 4/0028* (2013.01); *C03C 10/00* (2013.01); *C03C 23/0025* (2013.01); *G02B 1/02* (2013.01); *G02B 6/12002* (2013.01); *G02B 6/102* (2013.01); *G02B 2006/12038* (2013.01); *G02B 2006/12095* (2013.01)

(58) Field of Classification Search
CPC .... C03C 23/0025; G02B 3/0087; G02B 1/02; G02B 6/12002; G02B 6/102; G02B 2006/12038; G02B 2006/12095
See application file for complete search history.

(56) References Cited

U.S. PATENT DOCUMENTS

| | | | |
|---|---|---|---|
| 4,209,229 A | 6/1980 | Rittler | |
| 4,545,641 A | 10/1985 | Sobey, Jr. | |
| 4,635,082 A | 1/1987 | Domoto et al. | |
| 4,799,795 A | 1/1989 | Fateley | |
| 4,867,544 A | 9/1989 | Bornstein et al. | |
| 5,102,694 A | 4/1992 | Taylor et al. | |
| 5,166,827 A | 11/1992 | Noda | |
| 5,171,344 A | 12/1992 | Noda | |
| 5,200,858 A | 4/1993 | Hagerty et al. | |
| 5,236,486 A | 8/1993 | Blankenbecler et al. | |
| 5,245,328 A | 9/1993 | Garrett | |
| 5,254,454 A | 10/1993 | Mimiya et al. | |
| 5,262,896 A | 11/1993 | Blankenbecler | |
| 5,294,240 A | 3/1994 | Sanghera et al. | |
| 5,336,643 A | 8/1994 | Goto et al. | |
| 5,349,473 A | 9/1994 | Kurasawa et al. | |
| 5,448,409 A | 9/1995 | Noda | |
| 5,459,613 A | 10/1995 | Ku | |
| 5,537,505 A | 7/1996 | Borrelli et al. | |
| 5,608,568 A | 3/1997 | Blodgett et al. | |
| 5,731,906 A | 3/1998 | Morita | |
| 5,796,525 A | 8/1998 | Dempewolf et al. | |
| 5,867,264 A | 2/1999 | Hinnrichs | |
| 5,917,105 A | 6/1999 | Xu et al. | |
| 6,027,672 A | 2/2000 | Weitzel et al. | |
| 6,236,493 B1 | 5/2001 | Schmidt et al. | |
| 6,362,118 B1 | 3/2002 | Beall et al. | |
| 6,519,975 B1 | 2/2003 | Bange et al. | |
| 6,570,784 B2 | 5/2003 | Lowrey | |
| 6,586,474 B2 | 7/2003 | Webber et al. | |
| 6,586,761 B2 | 7/2003 | Lowrey | |
| 6,673,497 B2 | 1/2004 | Efimov et al. | |
| 6,687,153 B2 | 2/2004 | Lowrey | |
| 6,819,469 B1 | 11/2004 | Koba | |
| 6,908,812 B2 | 6/2005 | Lowrey | |
| 6,959,753 B1 | 11/2005 | Weber et al. | |
| 7,005,665 B2 | 2/2006 | Furkay et al. | |
| 7,119,353 B2 | 10/2006 | Lankhorst et al. | |
| 7,148,164 B2 | 12/2006 | Minamikawa et al. | |
| 7,164,818 B2 | 1/2007 | Bryan et al. | |
| 7,173,767 B2 | 2/2007 | Satzke | |
| 7,208,133 B2 | 4/2007 | Cho et al. | |
| 7,315,683 B2 | 1/2008 | Beall et al. | |
| 7,326,500 B1 | 2/2008 | Glebov et al. | |
| 7,405,883 B2 | 7/2008 | Hashimoto | |
| 7,501,648 B2 | 3/2009 | Chen et al. | |
| 7,570,432 B1 | 8/2009 | Yonak | |
| 7,687,871 B2 | 3/2010 | Maimon | |
| 7,800,095 B2 | 9/2010 | An et al. | |
| 7,880,194 B2 | 2/2011 | Breitwisch et al. | |
| 8,120,770 B2 | 2/2012 | Huang et al. | |
| 8,178,387 B2 | 5/2012 | Cheng et al. | |
| 8,306,786 B1 | 11/2012 | Lynch et al. | |
| 9,293,197 B2 | 3/2016 | Baleine et al. | |
| 9,340,446 B1 | 5/2016 | Baleine et al. | |
| 2002/0022564 A1 | 2/2002 | Minamikawa et al. | |
| 2002/0088952 A1 | 7/2002 | Rao et al. | |
| 2003/0132386 A1 | 7/2003 | Carr et al. | |
| 2004/0114204 A1 | 6/2004 | Klug et al. | |
| 2005/0030784 A1 | 2/2005 | Johnson | |
| 2005/0032623 A1 | 2/2005 | Araujo et al. | |
| 2005/0137075 A1 | 6/2005 | Messerschmidt et al. | |
| 2006/0051047 A1 | 3/2006 | Beall et al. | |
| 2006/0068154 A1 | 3/2006 | Parce et al. | |
| 2006/0097342 A1 | 5/2006 | Parkinson | |
| 2006/0135341 A1 | 6/2006 | Ellison et al. | |
| 2007/0034833 A1* | 2/2007 | Parce ................... B82Y 20/00 252/301.36 |
| 2007/0045771 A1 | 3/2007 | Philipp et al. | |
| 2007/0093373 A1 | 4/2007 | Borrelli et al. | |
| 2007/0116409 A1 | 5/2007 | Bryan et al. | |
| 2007/0181867 A1 | 8/2007 | Hewak et al. | |
| 2008/0192331 A1 | 8/2008 | Wang et al. | |
| 2009/0236079 A1 | 9/2009 | Khodadadi | |
| 2011/0013287 A1 | 1/2011 | Huang et al. | |
| 2011/0266445 A1 | 11/2011 | Beratan | |
| 2011/0293942 A1 | 12/2011 | Cornejo et al. | |
| 2012/0127562 A1 | 5/2012 | Kim et al. | |
| 2012/0213270 A1 | 8/2012 | Baraniuk et al. | |
| 2013/0043375 A1 | 2/2013 | Baleine et al. | |
| 2013/0314765 A1 | 11/2013 | Padilla et al. | |
| 2014/0378818 A1 | 12/2014 | Drake et al. | |
| 2015/0177426 A1 | 6/2015 | Sakoske et al. | |
| 2016/0088242 A1 | 3/2016 | Baleine et al. | |
| 2017/0249988 A1 | 8/2017 | Kan'an et al. | |

OTHER PUBLICATIONS

Non-Final Office Action for U.S. Appl. No. 14/518,106, dated Jul. 29, 2016, 13 pages.

Final Office Action for U.S. Appl. No. 14/518,106, dated Jan. 26, 2017, 14 pages.

Siegel, J. et al., "Rewritable phase-change optical recording in $Ge_2Sb_2Te_5$ films induced by picosecond laser pulses," Applied Physics Letters, vol. 84, Issue 13, Mar. 29, 2004, American Institute of Physics, 4 pages.

Non-Final Office Action for U.S. Appl. No. 13/585,577, dated Feb. 9, 2015, 12 pages.

Final Office Action for U.S. Appl. No. 13/585,577, dated May 26, 2015, 10 pages.

Notice of Allowance for U.S. Appl. No. 13/585,577, dated Aug. 20, 2015, 8 pages.

Non-Final Office Action for U.S. Appl. No. 14/172,175, dated Jul. 28, 2015, 11 pages.

Jared, David A. et al., "Electrically addressed spatial light modulator that uses a dynamic memory," Optics Letters, vol. 16, No. 22, Nov. 15, 1991, Optical Society of America, pp. 1785-1787.

Jiang, Lijun et al., "Design, fabrication and testing of a micromachined thermo-optical light modulator based on a vanadium dioxide array," Journal of Micromechanics and Microengineering, vol. 14, No. 7, May 13, 2004, IOP Publishing Ltd., pp. 833-840.

Verleur, Hans W. et al., "Optical Properties of $VO_2$ Between 0.25 and 5 eV," Physical Review, vol. 172, No. 3, Aug. 15, 1968, pp. 788-798.

Notice of Allowance for U.S. Appl. No. 14/172,175, dated Jan. 15, 2016, 10 pages.

Final Office Action for U.S. Appl. No. 14/957,671, dated Apr. 11, 2017, 5 pages.

Advisory Action for U.S. Appl. No. 14/518,106, dated Apr. 13, 2017, 3 pages.

(56) References Cited

OTHER PUBLICATIONS

Non-Final Office Action for U.S. Appl. No. 14/957,671, dated Nov. 22, 2016, 9 pages.
Non-Final Office Action for U.S. Appl. No. 14/518,106, dated Jan. 2, 2018, 14 pages.
Final Office Action for U.S. Appl. No. 14/518,106, dated May 17, 2018, 17 pages.
Non-Final Office Action for U.S. Appl. No. 14/518,106, dated Oct. 3, 2018, 19 pages.

* cited by examiner

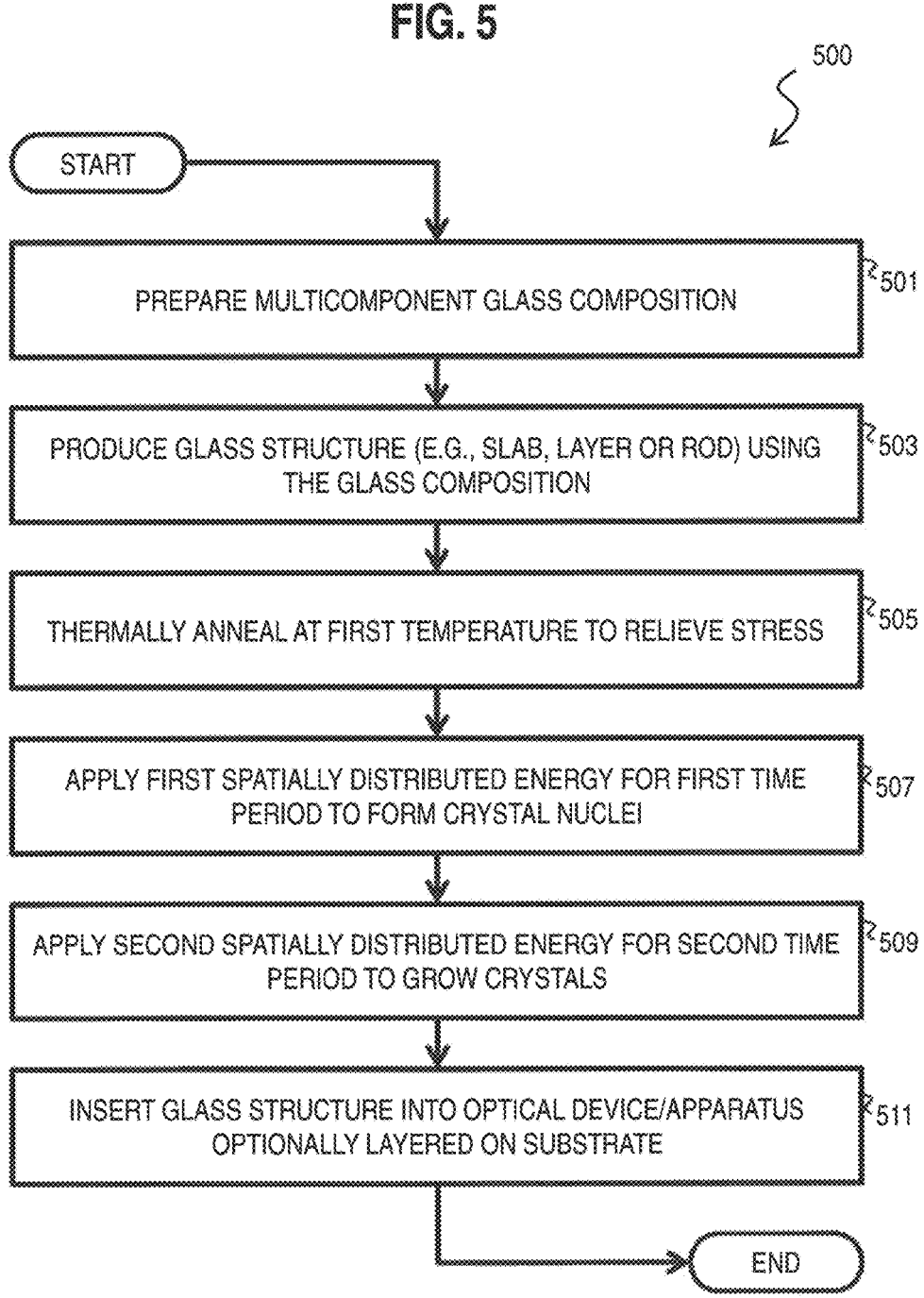

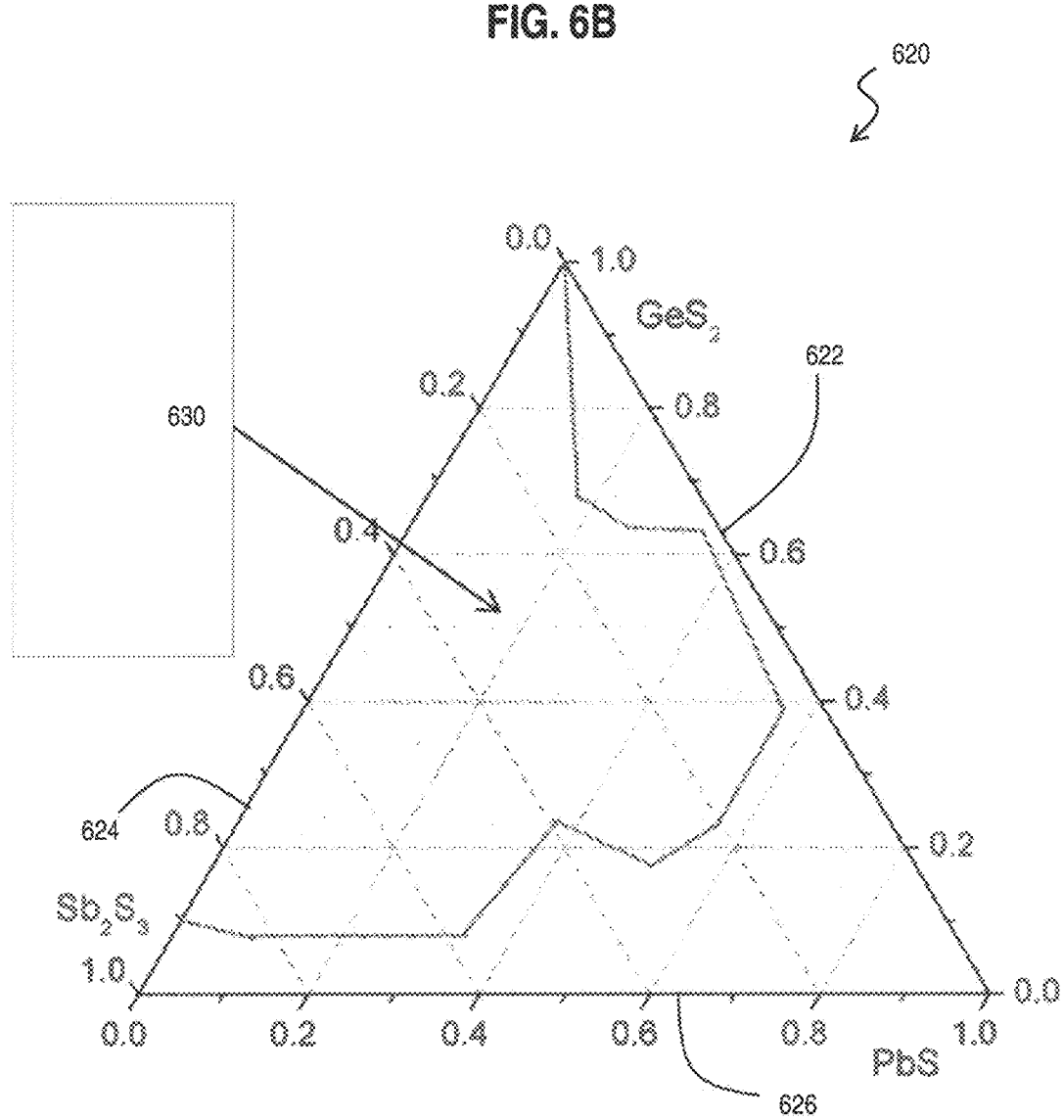

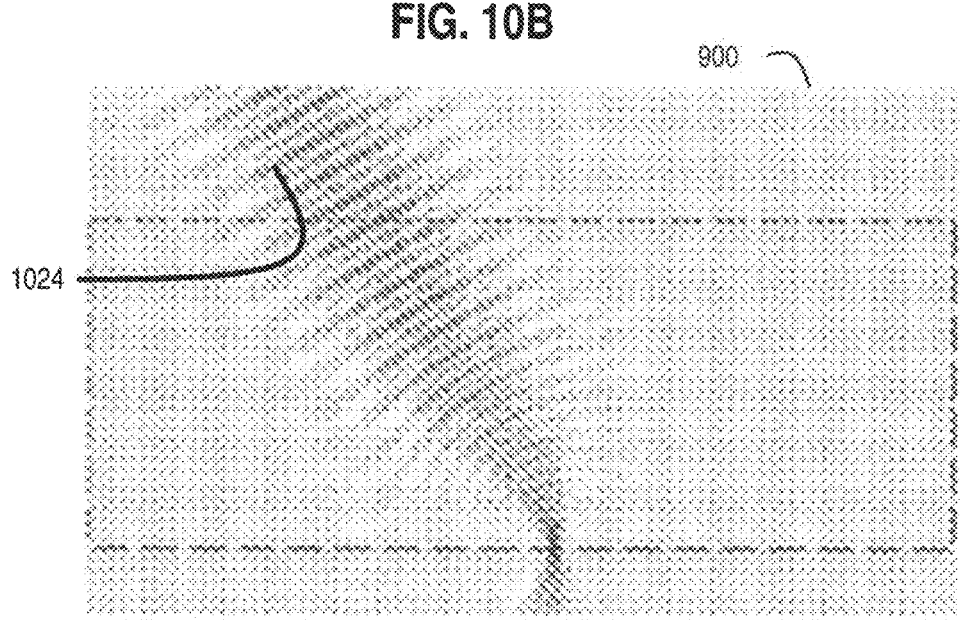
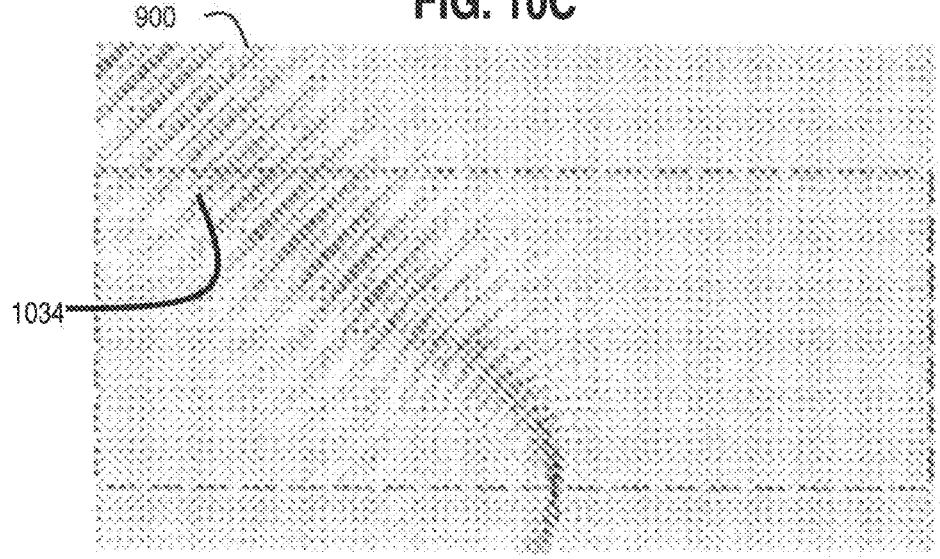

OPTICAL APPARATUS AND METHOD OF FORMING A GRADIENT INDEX DEVICE

CROSS-REFERENCE TO RELATED APPLICATIONS

This patent application is a divisional of co-pending U.S. patent application Ser. No. 14/172,175 filed on Feb. 4, 2014, which claims the benefit of U.S. Provisional Application No. 61/760,284 filed on Feb. 4, 2013, the disclosures of each of which are hereby incorporated herein by reference in their entireties.

BACKGROUND

Typically, optical devices such as imaging systems require the use of multiple lenses to form a high quality image with low aberrations. Use of a material with a constant index of refraction may require that each lens has a particular shape such as a convex or concave shape to direct light passing through the lens. Such designs often have structural limitations relating to a shape of a lens or a requirement for a number of different lenses and structural supports that add cost to an optical design or add a complexity to the design of such a structure that limits their applicability in different products. For instance, cost and design constraints can limit the application of such lenses.

Gradient refractive index (also referred to as "GRIN") optics use materials with variable index of refraction and thus often can be made to conform to size and shape constraints in many optical devices, apparatuses and applications. GRIN materials are often made using an ion exchanged cation modification to an optical device made of a base oxide glass matrix to create a modified refractive index profile that is different from the refractive index profile of the starting base glass matrix. Other GRIN optics have been formed by using a nanometer (nm, 1 nm=$10^{-9}$ meters) thick layer (nanolayer) polymer coextrusion forced assembly process to stack thousands of polymer layers to fabricate a GRIN sheet, or by solidifying through a lamination process thin layers of glass of varying index to form a solid GRIN structure. Additionally, a low refractive index polymer matrix doped with specific concentrations of high refractive index, nanometer sized, particles (nanopowders) dispensed through an inkjet dispenser can yield droplets of varying refractive index that can be layered to form a GRIN structure. Such GRIN optics, however, have drawbacks.

For instance, the ion exchange approach is often limited to oxide matrices that are strongly absorbing in the infrared spectrum of light, which limits their applicability. Organic polymer matrices also have strong absorption bands in the infrared. As another example, ion exchange processing requires an optical device to be submerged in a high temperature molten salt bath for hours of time, which limits their integration onto many types of substrates and their applicability for use with different optical apparatuses. Further, the fabrication method employed for ion exchange or the above referenced polymer coextrusion can require long exchange times or integration of thousands of multi-layer polymer stacks, which make the processes time consuming and difficult to scale for large production volumes. Organic polymer materials have limited thermo-mechanical and environmental stability. Laminated materials have cumbersome manufacturing protocols and limited applicability and stability. Additionally, such GRIN optics may only provide a gradient along one or two dimensions relative to a face of the material.

SUMMARY

It has been determined that a new optical device and method of making such a device is needed that permits the optical device, or optical apparatus incorporating same, to be made more cost effectively while also permitting the optical device to be used for a large number of different mechanisms or applications, including infrared applications. The method of making such an optical device or optical apparatus is preferably able to be proficiently scaled up for large volume production of one or more optical devices such as flat lenses, waveguides, transformation optics components, optics used in integrated circuits, optics used in metamaterial designs, volume gratings, spectral filters, hybrid diffractive optical components, optics used in focal plane arrays, hybrid refractive optical components, or optical elements that enhance solar collection, among others.

Embodiments relate to a gradient index device and a method for forming a gradient index device by precipitating crystals of nanometer scale (nanocrystals) in situ within a glass structure. A nanocrystal is a crystal with size dimensions in a range from about 1 nanometer to about 1000 nanometers. As used herein, a chemical component refers to a molecule of an atomic element or compound of different atomic elements.

In a first set of embodiments, a method includes obtaining a glass structure comprising a plurality of nucleation sites. The glass structure is formed from a glass composition that comprises a first chemical component and a second chemical component. A crystal of the second chemical component has a different second refractive index from a first refractive index of the first chemical component. Each nucleation site defines where a crystal of the second chemical component can be grown. The method includes causing crystals of the second chemical component to grow in situ at a set of the plurality of nucleation sites in order to produce a spatial gradient of a refractive index in the glass structure.

In a second set of embodiments, a method includes obtaining a glass structure formed from a glass composition that comprises a first chemical component and a second chemical component. A crystal of the second chemical component has a different second refractive index from a first refractive index of the first chemical component. The method further includes causing a plurality of nucleation sites to be formed in situ wherein each nucleation site defines where a crystal of the second chemical component can be grown. The nucleation sites are formed to produce a spatial gradient of a refractive index in the glass structure.

In a third set of embodiments, an optical device comprises a single glass structure in which a plurality of nanocrystals has been precipitated in situ in order to produce a spatial gradient of a refractive index in the glass structure.

Other details, objects, and advantages of the invention will become apparent as the following description of certain present preferred embodiments thereof and certain present preferred methods of practicing the same proceeds.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, several embodiments are described and explained with additional specificity and detail through the use of the accompanying drawings in which:

FIG. 5 is a flow chart that illustrates an example method to form an optical device or apparatus using the non-uniform spatial distribution of nanocrystals, according to an embodiment;

FIG. 6A and FIG. 6B are ternary phase diagrams that illustrate example glass compositions in which nanocrystals can be grown, according to various embodiments;

FIG. 10A through FIG. 10C are block diagrams that illustrate example light propagation through the optical device of FIG. 9 formed using the method of FIG. 5, according to various embodiments.

DETAILED DESCRIPTION

Figure 1:
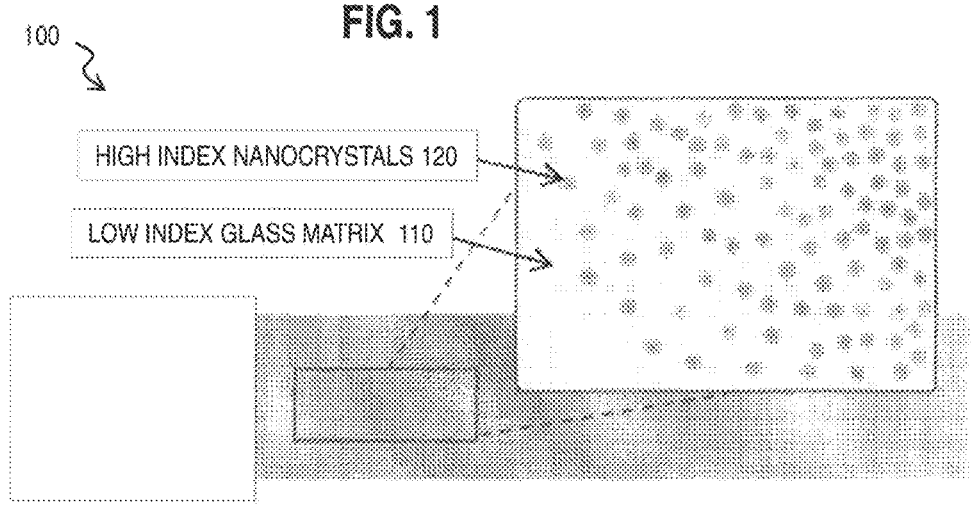
FIG. 1 is a block diagram that illustrates an example use of non-uniformly, spatially distributed nanocrystals in a glass matrix, according to an embodiment.

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

As used herein, the terms "index of refraction," "refractive index" and "index" are used interchangeably to indicate the index of refraction, n, which describes the speed v of electromagnetic (EM) wave propagation in a medium relative to the speed c of EM propagation in a vacuum according to Equation 1:

$$n = c/v \qquad (1)$$

The larger the index, the slower the speed of EM wave propagation in the medium. Refraction refers to a tendency of propagating EM waves to bend away from regions of low index toward regions of high index. Thus, varying the refractive index in a device enables the device to control the passage of EM waves. As used herein, light refers to any electromagnetic radiation at or near the visible and includes far infrared, infrared, visible and ultraviolet, with wavelengths from about 10 nm in the ultraviolet to about 100,000 nm in the far infrared. In dispersive media, the speed of light and thus the index of refraction varies with wavelength.

Glass refers to any non-crystalline (amorphous) material that reversibly transitions from a hard and relatively brittle state at low temperatures to a soft and fluid (molten) state at high temperatures. Glasses that include compounds of Silica (Si), called silicates, are often transparent, i.e., allow the passage of light with little scattering and attenuation, in the visible range; but, other compounds are well known that also have favorable optical properties. Infrared glasses are glasses that are transparent in the infrared region of the spectrum from about 750 nm to about 12,000 nm. In some preferred embodiments, infrared glasses exclude organic polymers.

Various embodiments described herein relate to methods of optical manipulation and methods of forming optical devices such as lenses, channels, or optical fibers. In one method embodiment, an optical device embodiment is formed that includes two dimensional or three dimensional spatial variations in nanocrystals that are themselves formed in situ within a glass structure to provide optical devices having a gradient refractive index that permits light to be refracted in a predetermined direction or path. Examples of optical devices or optical apparati may include, flat lenses, wave guides, transformation optics, optics used in integrated circuits, metamaterial designs, volume gratings, spectral filters, optics used in focal plane arrays, hybrid diffractive optical components, hybrid refractive optical components, or optical elements that enhance solar collection, among others. These embodiments have advantages over prior art devices in being producible in bulk, rather than in nanolayers, for example, and thus scalable; and being producible at serviceable temperatures, and thus suitable for a wide variety of integrated apparatus applications.

FIG. 1 is a block diagram that illustrates an example use of non-uniformly, spatially distributed nanocrystals 120 in a glass matrix 110, according to an embodiment. An optical device 100 includes non-uniformly spaced nanocrystals 120 of high refractive index in a glass matrix 110 of low refractive index. The nanocrystals 120 have a largest dimension in a range from about 1 to about 1000 nm, and preferably in a range from about 1 nm to about 250 nm. The nanocrystals are formed in situ within the device 100 by spatially varying the crystallization of one or more chemical components within the glass structure 100, leaving less of that chemical component in the residue material left outside the nanocrystals and called the glass matrix, herein. Although a gradual change in density of uniform sized crystals is illustrated in FIG. 1, in other embodiments the change is abrupt and the density of crystals is homogeneous in each of two or more separate portions or regions of the device. In some embodiments, the size of the nanocrystals also varies, instead of or in addition to the density of the crystals. To reduce or avoid scattering losses, it is advantageous for the sizes of the nanocrystals 120 to be small compared to the wavelength of the light to be refracted. As a rule of thumb, the nanocrystal size should be less than one tenth the wavelength of the propagating EM waves. So for 1000 nm wavelengths of the near infrared (NIR), a suitable size is about 100 nm; for medium wavelength infrared (MWIR) the size limit is about 400 nm, and for long wavelength infrared (LWIR) the size limit is about 1000 nm. Thus the larger nanocrystals, with sizes near 250 nm, are suitable for devices designed to affect medium and long wavelength infrared light.

Spatial variations in the crystallization can be caused (produced) by spatially varying energy applied to grow the crystals or by spatially varying nuclei on which the nanocrystals grow or some combination. The spatial variation in the nuclei can be achieved in different ways in different embodiments. In some embodiments, the nuclei are introduced into the glass matrix in a spatially varied way, e.g., by ion implantation through a mask. In some embodiments, the nuclei are formed from one or more chemical components also in the glass structure and the nuclei are formed by spatially varying energy applied to form the nuclei, which in some embodiments is a different type or amount of energy than the energy applied to grow the crystals. In various embodiments, any energy may be used to form nuclei or grow crystals, including heat, vibration, light, other electromagnetic radiation, or particle radiation, among others, alone or in some combination. In some embodiments, the chemical component for the nuclei is the same chemical component as the component for the crystals, but nucleation occurs as a result of a different type of energy than crystal growth. Crystal growth cannot occur without formation of nuclei. Typically, each "nucleus" is a very small crystal; it is the "seed" to grow the crystal, but it is still the same material. It can have different crystalline phases. A single material may have several distinct solid states capable of forming separate phases, e.g., water crystals can take hexagonal form, cubic form, and rhombohedral form. By forming the nuclei under controlled conditions, the particular phase desired can be preferentially produced, yielding crystals of a particular shape. The growth rate of the crystal also can depend on the phase. Thus, it is advantageous to perform this nucleation step in order to control the shape, size and distribution of the resulting crystals. If the pre-nucleation is not performed, the crystals can grow in all different sizes and shapes, and disadvantageous scattering can result.

In some embodiments, it was shown that spherical crystals as well as rod-like crystals have been grown because different phases were precipitated. In some embodiments, the different crystalline phases have different compositions, and thus the refractive index can also be controlled this way in such embodiments. However, precipitating different phases is not desirable in many embodiments, because it makes precise control of the GRIN profile more difficult.

Also as nucleation and growth of the crystal phase advances, the chemical components of the nuclei and crystal can become depleted in the glass matrix residue surrounding the crystals, and thus the composition of the glass matrix changes from the original glass composition. However, the glass structure that includes both the glass matrix and the nanocrystals retains the original glass composition. A glass structure that includes one or more crystal phases is called a glass-ceramic structure or a composite glass-ceramic structure.

Examples of the spacing between crystals in different regions of an optical device or optics apparatus may be appreciated from FIG. 1, which illustrates a crystal arrangement where different regions of a structure have crystals spaced apart at different increments. One region has crystals spaced closer to each other than another region, which has crystals spaced farther from each other as compared to the first region. The spacing of the crystals and their size and refractive index are controlled to minimize scatter, absorption, or other optical loss that can degrade the optical quality and function of the optics apparatus. In various embodiments, an optical device comprises a single glass structure that includes multiple regions of the same or differing volumes formed therein, which each has a differing size distribution or shape of crystals or has crystals spaced apart from one another at different characteristic lengths or gaps, or some combination. Thus the multiple regions define an index refractive index gradient within the optics apparatus that is in one, two or three dimensions. Several such glass structures can be combined in an optical apparatus, in some embodiments.

Figure 2A:
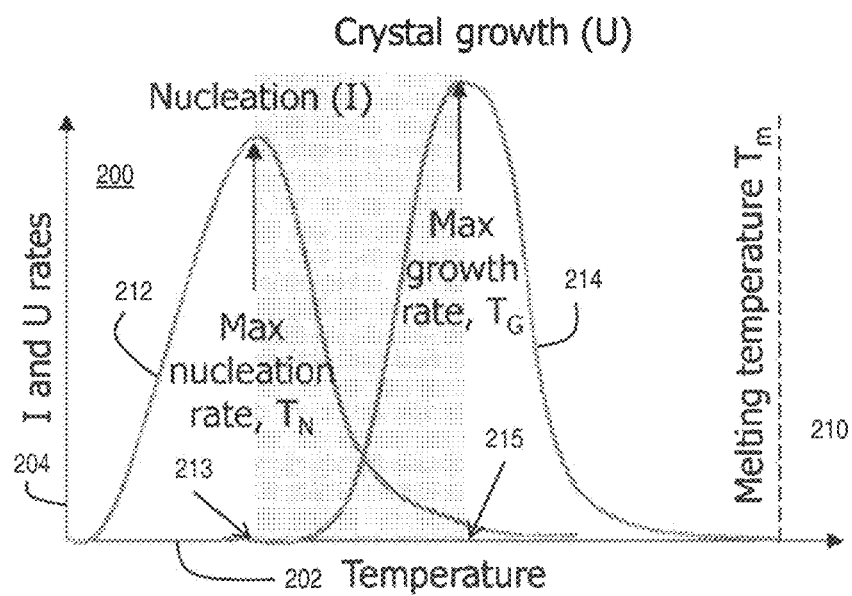
FIGS. 2A and 2B are block diagrams that illustrate an example dependence of nucleation and crystal growth on temperature, according to an embodiment.
Figure 2B:
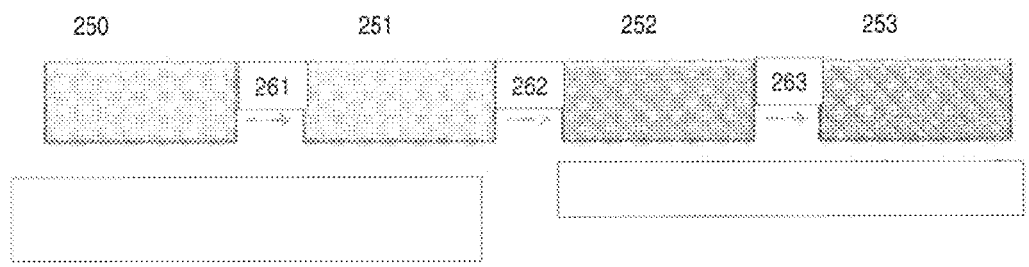

FIGS. 2A and 2B are block diagrams that illustrate an example dependence of nucleation and crystal growth on temperature, according to an embodiment. The diagram of FIG. 2A is in the form of a schematic plot with the horizontal axis 202 indicating temperature in relative units and the vertical axis 204 indicating rate in arbitrary units per unit time. The glass matrix of this illustrated embodiment melts at melting temperature Tm indicated by vertical line segment 210. Trace 212 indicates the rate of nucleation (I) from the glass structure of the illustrated embodiment, with the maximum rate occurring at temperature $T_N$ 213. Trace 214 indicates the rate of crystal growth (U) in the glass structure of the illustrated embodiment, with the maximum growth rate occurring at temperature $T_G$ 215. The number of nuclei per unit volume in a region of a device can be controlled by holding the temperature of the region at or near $T_N$ for a time sufficient to produce the desired number of nuclei per unit volume. The size of the crystals in the region of the device can be controlled by holding the temperature of the region at or near the different temperature $T_G$ for a time sufficient to produce the desired crystal size. Thus any region of a device can be caused to have any number and size of nanocrystals, and a desired refractive index gradient can be imposed on the device by varying the times at or near the two different temperatures at various regions in the device.

In some embodiments, stresses introduced during formation of the glass structure are reduced in a separate heating step. The diagram of FIG. 2B indicates the progression of a region of an optical device during heating at multiple temperatures. Initially a region of an optical device comprises the glass structure under stress 250. At step 261, the region is subjected to a first temperature, called an annealing temperature, for a first time sufficient to relieve stresses in the glass structure, so that the region comprises glass structure with reduced or eliminated stress 251. At step 262, the region is subjected to a second temperature at or near $T_N$ for a second time sufficient to cause nucleation so that the region comprises glass structure with a higher density of nuclei 252. At step 263, the region is subjected to a third temperature at or near $T_G$ for a third time sufficient to cause growth of crystals so that the region comprises glass structure with a higher density of crystals of desired size 253. Any number of such regions can be formed in a device by partially or completely thermally isolating each region for independent heating sequences. The amount and rate of heat applied to the edge of a device (e.g., in a furnace) to achieve a desired temperature profile within the glass structure depends upon the thickness and thermal conductivity and thermal expansion of the glass structure with and without nuclei or crystals, or some combination, between the heating edge and the region of the device to populate with nanocrystals. In various embodiments, other methods to heat without the use of a furnace, or in combination with a furnace, are used. In some embodiments an optical apparatus comprises combining multiple optical devices formed as described here.

Figure 3:
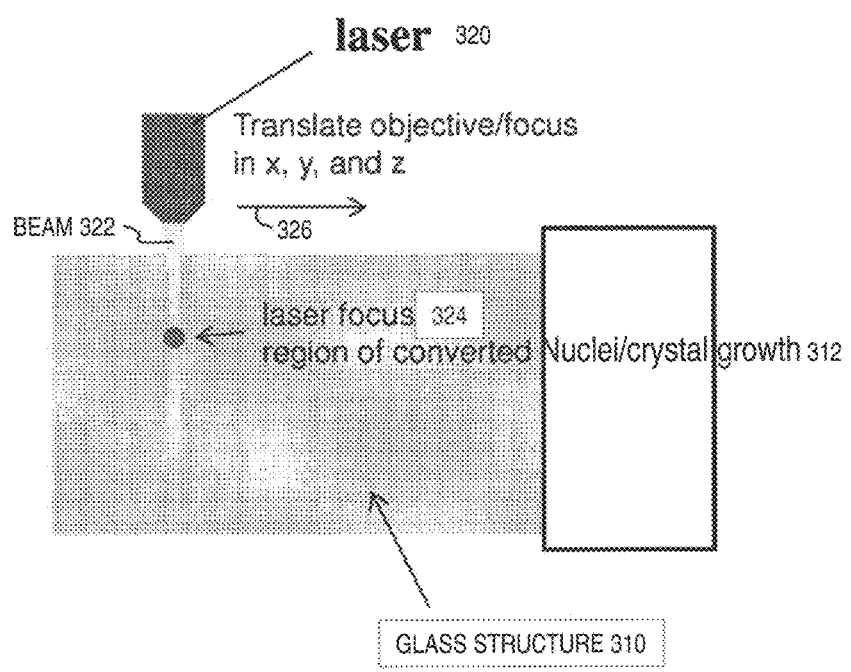
FIG. 3 is a block diagram that illustrates example use of a laser to impose non uniform spatial distributions of nuclei or nanocrystals or some combination, according to an embodiment.

FIG. 3 is a block diagram that illustrates example use of a laser 320 to impose non uniform heating, and, consequently, non-uniform spatial distributions of nuclei or nanocrystals or some combination, according to an embodiment. The laser 320 is operated to form a beam 322 focused at laser focus 324. The laser is translated in one (x), two (x,y) or three (x,y,z) dimensions to position laser focus 324 on a region 312 of a glass structure where a chemical component in the glass structure is converted to nuclei or grows onto crystals or both. The laser is typically tuned to at least one wavelength that is absorbed by at least one chemical component of the glass structure, which then absorbs the energy, increases its temperature and heats the structure in the vicinity of the laser focus 324. By supplying sufficient intensity for long enough time, one or more desired temperatures, such as $T_N$ or $T_G$, can be achieved for any desired duration of time. Alternatively, nuclei may be induced in the material through means which rely on other modes of laser interaction such as use of nonlinear optical processes where glass properties dictate the magnitude of the response.

Figure 4:
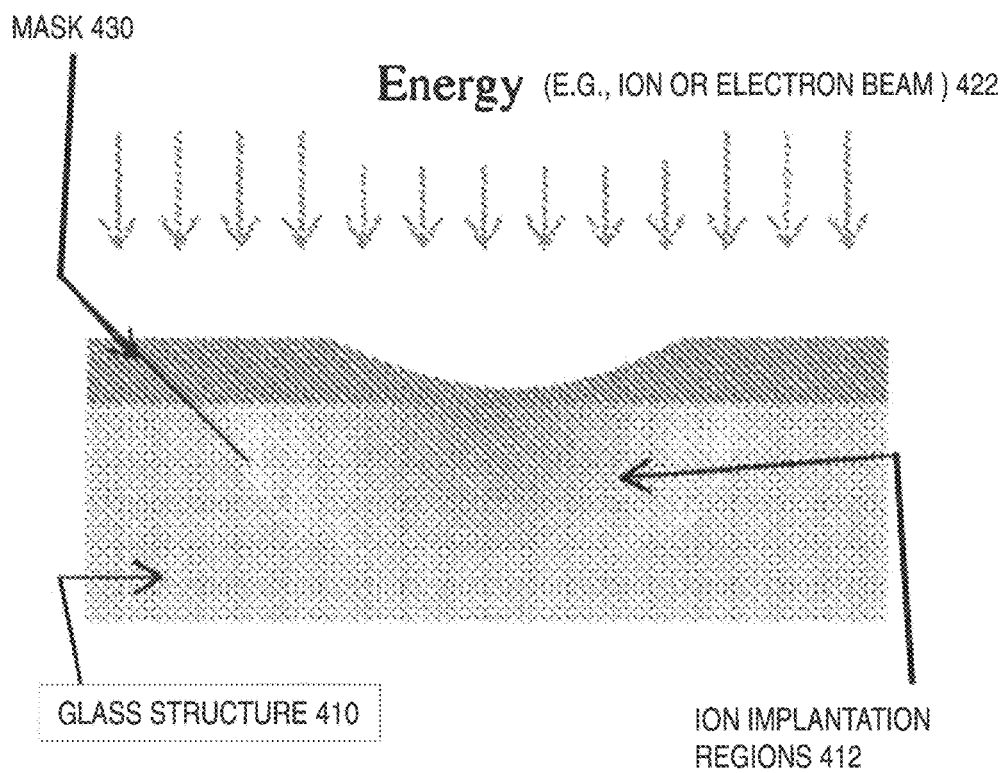
FIG. 4 is a block diagram that illustrates example use of a mask to impose non-uniform spatial distributions of compounds or nuclei or nanocrystals or some combination, according to an embodiment.

FIG. 4 is a block diagram that illustrates example use of a mask 430 to impose non uniform spatial distributions of chemical components or nuclei or nanocrystals or some combination, according to an embodiment. During a process depicted in FIG. 4, a mask 430 of varying thickness is placed adjacent to glass structure 410, and ions are implanted to a depth or range or both based on the mask thickness and an amount and duration of energy 422, e.g., in an ion beam, to form ion implantation regions 412 of varying ion concentration. The ions then are used as the nuclei for growing nanocrystals, or to augment the amount of the chemical component that is to be grown in situ into nanocrystals or to separate chemical components from more complex compounds. The resulting crystal spacing or shape or size then varies based, at least in part, on the varying ion concentrations in the regions 412. In some embodiments the interaction of the ions with the glass structure based on one or more elements or compounds already in the glass structure is sufficient to nucleate nanocrystals. In other embodiments, electron beams could be used to introduce sufficient energy to nucleate the nanocrystals.

For example, a laser or other ion source or electron source applies energy directed to the mask positioned over a glass structure. The mask has a predefined profile to define how the light, ions, or electrons interact with the glass structure to define a desired GRIN structure or GRIN profile in two or three dimensions. The ions or electrons in one step may be added to a first region after passing through the mask based on the profile of the mask. In some embodiments, multiple such radiation steps are utilized. For instance, other ions may be implanted in subsequent ion implantation steps at different energy levels to achieve additional implantation of ions within the underlying structure to develop a desired glass composition for producing the desired GRIN profile or device.

FIG. 5 is a flow chart 500 that illustrates an example method to form an optical device or apparatus using the non-uniform spatial distribution of nanocrystals, according to an embodiment. Although steps are depicted in FIG. 5 as integral steps in a particular order for purposes of illustration, in other embodiments, one or more steps, or portions thereof, are performed in a different order, or overlapping in time, in series or in parallel, or are omitted, or one or more additional steps are added, or the method is changed in some combination of ways. For example, in some embodiments, a glass structure with evenly distributed nuclei is obtained from an outside source and steps 501 through 507 are omitted and replaced by a step to obtain such a glass structure.

In step 501 a multicomponent glass composition is prepared. The glass composition is made up of at least two materials, a first chemical component that does not form crystals and a second chemical component that is different from the first and is involved in the formation of crystals. A crystal of one of the second chemical component has a different refractive index from the first chemical component or from a glass matrix comprising the residual material not formed into crystals.

In step 503, a structure is formed from the glass composition. For example, in various embodiments, the glass composition is formed into a rod or slab or fiber. In some other embodiments, one or more layers of the glass composition are deposited onto an optical apparatus made of the same or different material. In some embodiments, the rod or slab is machined, e.g., sliced, or lapped or polished, or some combination, into a desired form factor for fitting into a multicomponent system. In some embodiments, step 503 includes ion implantation for one or more constituents of the glass composition that benefit from augmentation. For example, to include chemical components that in too high a concentration can interfere with forming the glass structure, but are desired in higher concentration in the glass structure, those compounds are augmented during step 503 by ion implantation to achieve the desired glass composition in the glass structure. Such an example is provided below for a specific embodiment.

In step 505, the glass structure is annealed at a first temperature to relieve stress, as depicted in FIG. 2B at step 261. In some embodiments, step 505 is performed as part of step 503. In some embodiments, step 505 is omitted.

In step 507, a first spatially distributed energy source is applied to the glass structure for a first time period to form nuclei on which to grow crystals. In some embodiments, the spatial distribution of the energy source is uniform. In other embodiments the energy is not uniformly spatially distributed through the glass structure. Any energy source known to cause nucleation at desired regions of the glass structure may be used. For example, in some embodiments, heat is applied along one edge and the resulting temperature decreases gradually with distance from the edge, depending on the thermal conductivity of the intervening glass composition or glass matrix. In other embodiments, a laser (e.g., as depicted in FIG. 3) or electron or ion beam (e.g., as depicted in FIG. 4) is used and focused at depth or masked, or some combination, to populate one or more regions with such nuclei. In some embodiments, the nuclei are small clusters of molecules of a chemical component included in the glass composition. For instance, composition specific absorption characteristics of the glass composition at a characteristic spectral wavelength can determine the magnitude of absorption of the heat and thus the heat that is deposited within a local volume subjected to laser exposure. In some embodiments, the nuclei are single molecules of a compound composed of elements of other compounds included in the glass composition. In some embodiments, the nuclei are made up of the same molecules that make up the resulting nanocrystals. The total dose (energy level multiplied by time duration) of the energy applied is selected to produce a desired target density or density spatial gradient of nuclei in each region of the glass structure.

In step 509, a second spatially distributed energy source is applied to the glass structure for a second time period to grow crystals on the nuclei. In some embodiments, the spatial distribution of the energy source is uniform. In other embodiments the energy is not uniformly spatially distributed through the glass structure. Any energy source known to cause crystal growth at desired regions of the glass structure may be used. For example, in some embodiments, heat is applied along one edge and the resulting temperature decreases gradually with distance from the edge, depending on the thermal conductivity of the intervening glass composition or glass matrix. In other embodiments, a laser (e.g., as depicted in FIG. 3) or electron or ion beam (e.g., as depicted in FIG. 4) is used and focused at depth or masked, or some combination, to arbitrarily grow crystals in one or more regions. The total dose (energy level multiplied by duration), of the energy applied is selected to produce a desired target crystal size or crystal size spatial gradient in each region of the glass structure. If the nuclei are uniformly distributed in the glass structure, then the energy to grow the crystals is non-uniformly distributed. However, if the nuclei are non-uniformly distributed in the glass structure, then, in some embodiments, the energy to grow the crystals is uniformly distributed and a spatially varying refractive index is still produced. In some embodiments, the first energy and second energy are the same. In some embodiments, the first time duration and the second time duration are the same.

In some embodiments, the amount of energy transferred to the glass matrix is sufficiently high to precipitate out one of the chemical components of the glass composition so that these components crystallize. A first energy transfer setting is maintained for a predetermined time period, in some embodiments, to define a growth time period for the grown crystals. In some embodiments, the crystals that are formed are uniform in size and are uniformly spaced.

In some embodiments, the crystal formation process is configured to adjust the spacing between crystals so there is a non-uniform spacing. For example, a nucleating agent is included within the glass structure at different regions or via a homogenous dispersal to help facilitate crystallization of certain components of the glass composition, such the high refractive index material of the glass composition. The nucleating agent provides a nucleating site for selectively precipitating the high refractive index material to form and grow the crystals at desired locations within the glass matrix. Titanium, gold, platinum, and nickel are examples of such nucleating agents that are part of the glass composition to provide such selective precipitation of crystals in some embodiments. Of course, in other embodiments, other nucleating agents are also used, such as one or more different types of elements or impurities such as one or more metal oxides or one or more other metals.

In some embodiments, uniform heating of the glass composition provides an isothermal temperature profile or multistep temperature profile resulting in a final morphology for the distribution of nanocrystals. In some embodiments, a gradient heat treatment within a furnace provides a non-isothermal gradient temperature profile dictated by the spatial variation within the heating region of the structure made of the glass composition. For such a variation, the growth of the crystals is dictated by the material growth rate at the specific locations of nucleation defined by a temperature/rate point on a material's nucleation and growth rate (I, U) curves. The temperature gradient profile defines the local crystal size and density, and, thus, refractive index gradient within the structure; and can permit the gradient to be one, two or three dimensional in the glass structure. A local size of the gradient is dependent upon the local volume fraction of the formed crystal and remaining glass matrix in each spatial volume or each region of the glass structure.

In step 511, the glass structure forms the optical device or is inserted into an optical apparatus. For example, the glass structure is configured as an optical device comprising a lens with high refractive index due to many nanocrystals surrounded by glass with low refractive index having few or no nanocrystals. In some embodiments, this optical device is placed in an imaging system to produce an example optical apparatus.

In contrast to the ion-exchanged or stacked-polymer methods, embodiments of method 500 can create spatially controlled arbitrary refractive index profiles throughout the volume of a glass work piece (i.e., a glass structure) through the use of any of a number of mechanisms, which include infrared nanosecond irradiation and ion beam exposure, as a means of generating well-controlled crystal volume fractions. Writing an effective refractive index higher than that of the bulk glass matrix can permit the creation of standard optical elements and element systems inside a single flat glass work piece. For some embodiments, the GRIN profile may be defined within the work piece so that the refractive index gradient is zero throughout each of a high-index region and a low-index region, but exhibits an abrupt step change at the interface between the high and low refractive index regions.

Figure 6A:
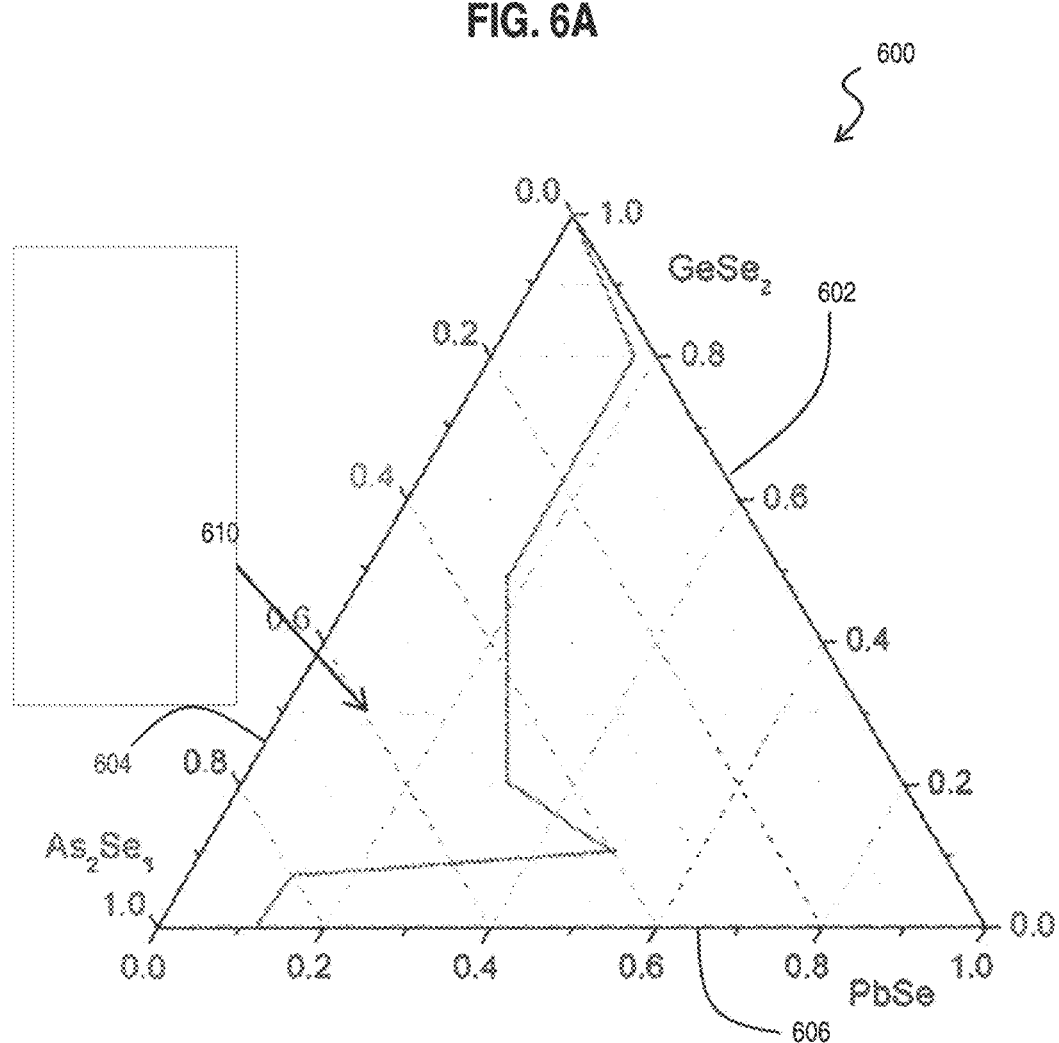

The glass composition assembled in step 501 may be formed from a number of constituent materials to form an amorphous glass, in various embodiments. The method 500 can be applied to metal oxide glass compositions or those containing no oxygen but only non-oxide glass forming compounds. The starting glass structure and its constituent elements dictate the possible nuclei and crystals that can form upon controlled energy transfer (e.g. irradiation, heat, other energy transfer mechanism). FIG. 6A and FIG. 6B are ternary phase diagrams that illustrate various example glass compositions in which nanocrystals can be grown, according to various embodiments. Each of the three sides of the ternary phase diagram indicates a molar fraction of one component of the three components to the total amount of the three components per mole. The glass composition may also include other components not included in the diagram.

FIG. 6A is a diagram 600 for an example composition comprising optimized molar fractions of germanium selenide ($GeSe_2$) on side 602, arsenic triselenide ($As_2Se_3$) on side 604, and lead selenide (PbSe) on side 606. Compositions in area 610 of diagram 600 are found to permit nucleation and crystal growth for high refractive index, lead selenide-based nanocrystals. In this embodiment, the first chemical components include compounds germanium selenide and arsenic triselenide; and the different chemical component for crystal formation includes compound lead selenide. It should be noted that other compositions containing lead selenide can be made without any crystals, and the resulting glass is crystal-free. As may be appreciated from FIG. 6A, the $GeSe_2$ and $As_2Se_3$ chemical components can provide fabrication advantages in some embodiments as such chemical components permit thermally stable bulk glasses to be heat treated or otherwise treated via an energy transfer mechanism (e.g. irradiation, electron excitation, etc.) to transform a high refractive index compound (e.g. PbSe) within the glass composition into crystals to define high refractive index, low loss nanocrystals within the material to define a GRIN profile within two or three dimensions of the structure. Prior to thermal or laser treatment in subsequent steps, the PbSe-containing compounds do not possess crystals.

Similarly, FIG. 6B is a diagram 620 for an example glass composition comprising optimized molar fractions of germanium sulfide ($GeS_2$) on side 622, antimony trisulfide ($Sb_2S_3$) on side 624, and lead sulfide (PbS) on side 626. Compositions in area 630 of diagram 620 are found to permit nucleation and crystal growth for high refractive index, lead sulfide-based nanocrystals. In this embodiment, the first chemical components include compounds germanium sulfide and antimony trisulfide; and the different chemical component that forms the nanocrystals includes compound lead sulfide. As may be appreciated from FIG. 6B, the $GeS_2$ and $Sb_2S_3$ chemical components can provide fabrication advantages in some embodiments as such chemical components permit thermally stable bulk glasses to be heat treated or otherwise treated via an energy transfer mechanism (e.g. irradiation, electron excitation, etc.) to transform a high refractive index compound (e.g. PbS) within the glass composition into crystals to define high refractive index, low loss nanocrystals within the material to define a GRIN profile within two or three dimensions of the structure.

It should be understood that other compositions may also be utilized that include other components or other compounds within such a composition to provide an amorphous glass structure in which nanocrystals may be precipitated in situ from the glass composition. As one example of yet other alternative compositions for a glass composition to form an amorphous glass structure, it is contemplated that a low to moderate molar concentration of any high refractive index compound or material is added, in various embodiments, to a first chemical component composed of lower refractive index materials. One example of such a composition would be a Ge—As—Pb—S glass system that is treated to have well defined sulfide based crystalline phases. Another example is a Sb—Ge—Pb—Se glass system that is treated to have well defined selenide based crystalline phases. In some embodiments, the selection of materials can include alternative, metal oxide components and no sulfur or selenium containing materials.

In some embodiments, the glass composition is prepared in stages, e.g., with the first chemical component being prepared and subsequently adding a high refractive index chemical component such as PbSe, PbS, cadmium sulfide (CdS) or cadmium selenide (CdSe). In some embodiments, however, the absorption of such chemical components may result in some chemical components being less suitable than others for different applications—depending on a given set of design criteria. Alternatively, in some embodiments, a chemical component of the glass composition or glass structure is modified through methods such as ion implantation, as depicted in FIG. 4.

The described approach for fabricating customizable GRIN components can be utilized for a number of different spectrum ranges. For instance, one embodiment produces GRIN devices for use in light that is transmitted within the infrared spectrum. For example, an optical composition including chalcogenide (ChG) materials may be utilized. An example of a ChG glass system based on an established highly mid-wave infrared (MWIR) transmissive ChG glass system is $As_2Se_3$. Compositional tailoring for enhancing the mechanical and thermal properties can involve the addition of a highly coordinated former such as $GeSe_2$, which creates a binary $GeSe_2$—$As_2Se_3$ base compound, or first chemical component, that can be made using standard melt-quenching techniques. The addition of low to moderate molar concentrations of a high refractive index species such as PbSe to the base glass system as the second crystal forming chemical component allows the thermally-stable ChG glasses to be selectively transformed into a glass-ceramic composite that yields well-dispersed uniform-size PbSe or $As_2Se_3$ nanocrystals, or both, within the glass matrix upon controlled heat treatment. Both of these crystalline phases can have low intrinsic absorption loss across the MWIR (k<0.2), and PbSe has an exceptionally high refractive index, n=4.9 relative to the much lower indices of n=2.4 and 2.8 for the $As_2Se_3$ glass matrix and crystalline phases and n=2.5 for the $GeSe_2$ based glass. Thus, values of Δn~0.5 can be obtained with substantially low scattering loss in $GeS_2$—$As_2Se_3$—PbSe (GAP-Se) glasses by grading the nanocrystal-to-glass volume filling fraction from 0% to 50% and higher.

In addition to the exceptional optical properties, these ChG glasses can be compatible with precision molding processes, and the thermo-mechanical properties of the glass ceramics may also be superior to pure (non-crystallite containing) glasses, which make such embodiments of an optical device likely to be a cost effective and proficient embodiment for use in making optical apparatuses or optical devices for bulk and micro-scale optical components.

For some embodiments, the maximum Δn(x,y,z) may be limited by the maximum 20-40% PbSe composition, beyond which stable (as melted, crystal-free) bulk GAP-Se glass can no longer be formed. It is contemplated that, in some embodiments, evaporated GAP-Se films can be deposited on a homogeneous lens or optical component to minimize such limitations or overcome these potential limitations. It is also contemplated that, in some embodiments, high-dose ion implantation is used to incorporate Pb or PbSe into the glass composition to minimize such limitations or overcome these potential limitations. In this way, the amount of Pb or PbSe can be increased beyond the glass forming limit within the near surface region of the bulk ChG components, e.g., topmost about 1 micrometer (μm, 1 μm=$10^{-6}$ meters) for a mask-less high energy implant, up to 10 times this depth with field-assisted ion diffusion for the thickness of the film up to 1 millimeter (mm, 1 mm=$10^{-3}$ meters). Upon annealing, the additional Pb is used to achieve higher PbSe nanocrystal filling fractions, and correspondingly higher values of effective Δn (Δneff). Because the Pb concentration profile can be tailored by sequential implants at different ion energies and ion doses, optional thermal anneals to promote diffusion between sequential steps, as well as by protecting the surface of the component with predefined 3D implant masks, complex 3D spatial profiles with large gradients in Pb can be formed. Following implantation, a thermal anneal is used in some embodiments, to controllably nucleate and grow nanocrystals within the glass matrix to create the desired GRIN profile. It is contemplated that such a fabrication strategy could provide a cost effective and proficient manufacturing process that is applicable for GRIN profiles defined in transformation optic devices or transformation optic apparatuses that need to have large Δn and large n spatial gradients over limited depths.

As indicated above with reference to FIG. 1, in some embodiments, the high refractive index regions each has a plurality of spaced apart nanocrystals 120 formed therein. The nanocrystals have a higher refractive index than the surrounding glass matrix of glass structure 110 to produce a region with a higher effective refractive index than regions without the nanocrystals. The size, geometry, and concentration of the nanocrystals may be selected to meet a particular set of design criteria for minimizing optical loss due to scattering. The shape and spacing of the nanocrystals are determined by treating a multicomponent glass matrix having constituents included therein to be precipitated into crystals. The nanocrystals are nucleated therein homogeneously or heterogeneously (e.g. on nuclei or via optical exposure, ion exposure, electron exposure or other mechanism) to be precipitated into crystals. For example, crystal nucleation may be performed by thermally heating one or more regions of a glass matrix, irradiating one or more regions of the glass matrix, or otherwise initiating an energy transfer to one or more regions of the structure to transfer additional energy for a predetermined period of time, as described above.

Crystal growth is subsequently propagated by exposing the one or more regions or the entire structure to a source that transfers energy to the structure to facilitate formation of the crystals. For example, irradiation of the one or more regions of the glass matrix or thermally heating the one or more regions of the glass matrix provides such energy transfer to form the crystals, in various embodiments. In some embodiments, the number density and concentration of crystals is dictated by the number density of nuclei formed in the first of the two energy treatment steps (e.g. irradiation, thermal heating, or other energy transfer mechanisms). The crystals form and grow by depleting the region surrounding the nuclei of the constitute elements that make up the resulting crystals.

To form the crystals when fabricating the optical device or optics apparatus, control of the localized thermal dose, localized irradiation dose, or other form of energy transfer to the glass matrix may be involved. For example, the duration of heating, irradiation, or other energy transfer mechanism that is used to add energy to the glass matrix to grow the crystals, determine the shape and size of the formed crystals, which may then define the refractive index or refractive index gradient of the region in which those crystals are formed.

Both the size of the crystals and the spacing between crystals are controlled, in some embodiments, to provide a predetermined or desired spatial arrangement of nanocrystals to define the high refractive index regions. In different embodiments, various ways are employed to form the above mentioned nanocrystals in different optical devices or optics apparatuses such as lenses, flat lenses, wave guides, transformation optics components, optics used in focal plane arrays, optics used in integrated circuits, metamaterial designs, volume gratings, spectral filters, hybrid diffractive optical components, hybrid refractive optical components, or optical elements that enhance solar collection.

Figure 7:
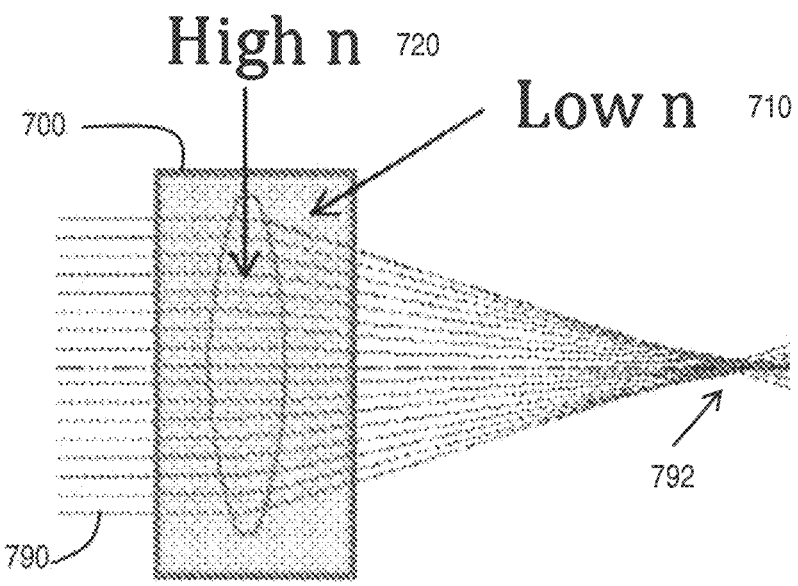
FIG. 7 is a block diagram that illustrates an example optical device formed using the method of FIG. 5, according to one embodiment.

FIG. 7 is a block diagram that illustrates an example optical device 700 formed using the method of FIG. 5, according to one embodiment. In this embodiment, the device 700 is a lens that has a high refractive index region 720 within a central portion of the lens structure and a lower refractive index region 710 that surrounds the high refractive index region. There is a discontinuity in refractive index where the two regions meet. Rays of light 790 are refracted to a focal point 792 by the device 700. In another example embodiment, the lens has an arrangement of nanocrystals formed therein to define a refractive index gradient within the lens structure. The gradient may be defined by nanocrystals in different regions having a larger or smaller size than other crystals formed in other regions or by different crystals in different regions being more closely positioned to each other or being positioned further from each other than other regions to define a predetermined refractive index gradient within the lens. An advantageous feature of the lens 700 is that, unlike a common glass lens shaped like region 720 with the low refractive index provided by freespace, for which the lens has to be mounted in an apparatus, the device 700 has a simple rectangular form factor that can be laid against other components of an optical apparatus, without the need for additional or complicated support structures.

Figure 8:
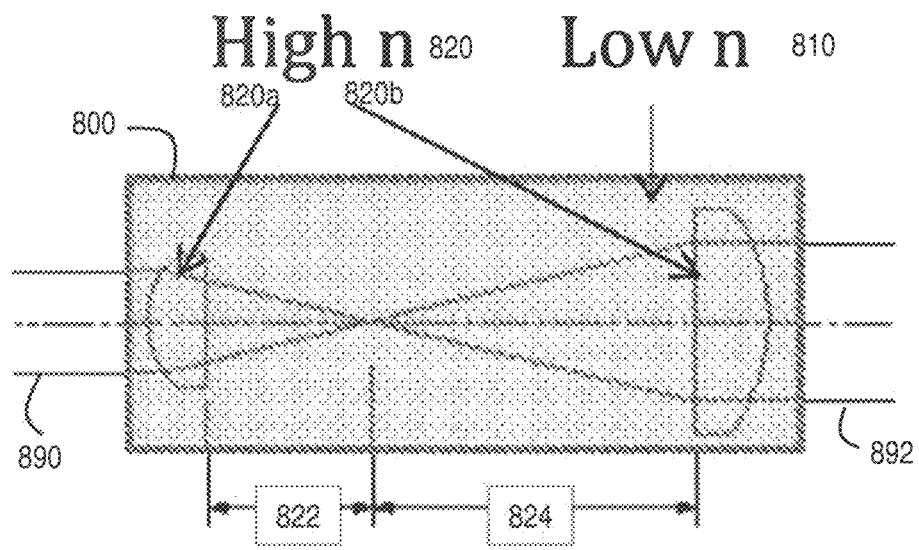
FIG. 8 is a block diagram that illustrates an example optical device formed using the method of FIG. 5, according to another embodiment.

FIG. 8 is a block diagram that illustrates an example optical device 800 formed using the method of FIG. 5, according to another embodiment. This embodiment of an optical device 800 is a multi-element beam expander that has a structure that has multiple regions defined therein that include crystals formed within these regions to define high refractive index region 820a and region 820b. These high refractive index regions 820 have defined refractive indexes that are higher than other lower refractive index regions 810. In various embodiments, the high refractive index regions 820 have the same refractive index value, or each has a value within a range of acceptable high refractive index values. In some embodiments, each high refractive index value has a different value. In various embodiments, the high refractive index regions 820 are fully surrounded or partially surrounded by one or more low refractive index regions 810. The device 800 comprises a structure that functions as a multi-element beam expander that causes beam 890 to be focused at focal length 822 of the first high n region 810a, which focal point is a focal length 824 from the different second high n region 820b. The emitted light 892 is expanded.

It is noted that the device 800 comprises a structure with a form factor that, in various embodiments, is a flat plate, a flat disc, a cubical shaped block, or other member that has any of a number of shapes. For example, in some embodiments, the structure form factor is shaped to be polygonal (e.g. rectangular, triangular, square, hexagonal, octagonal, etc.) or generally curved (e.g. a circle, an oval, a half-circle shape, etc.) or takes on another shape such as a frustum shape or a trapezoidal shape. It should be understood that the passage of light indicated in the figures may be seen as passing through a height, a width, or a depth of the structure (e.g. vertically from top to bottom, laterally side to side, or longitudinally from end to end, etc.).

Figure 9:
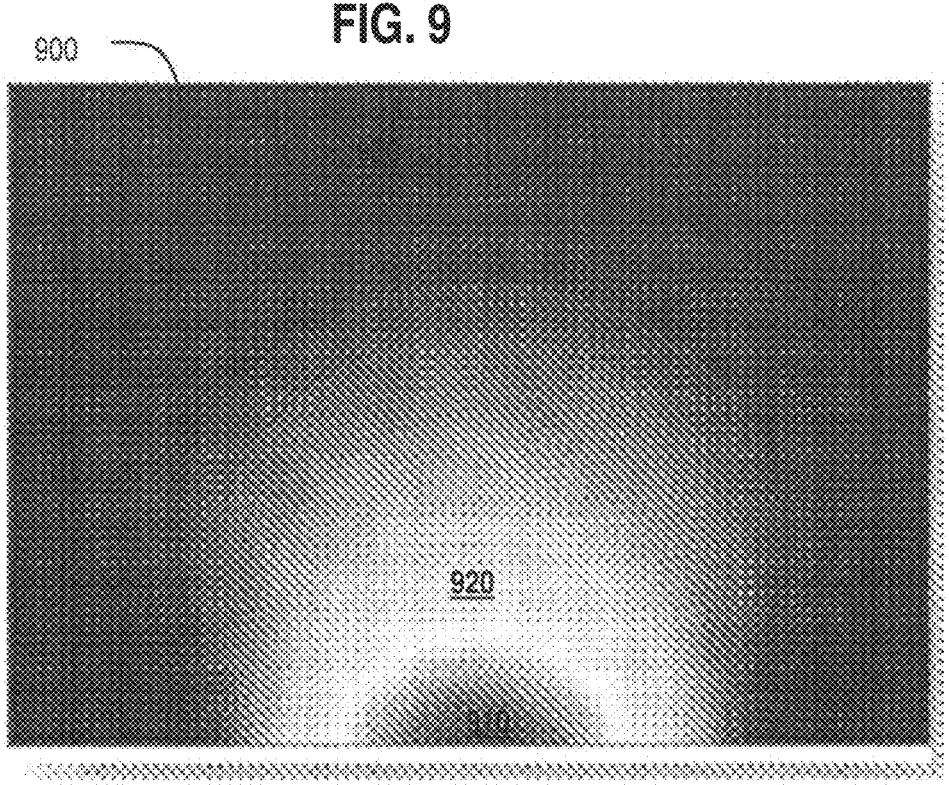
FIG. 9 is a block diagram that illustrates an example optical device formed using the method of FIG. 5, according to yet another embodiment.
Figure 10A:
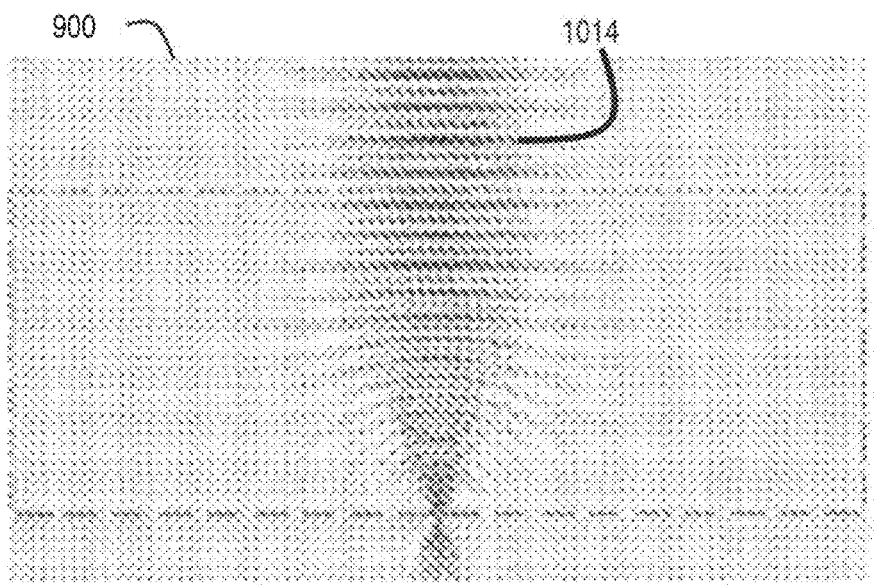

FIG. 9 is a block diagram that illustrates an example optical device 900 formed using the method of FIG. 5, according to yet another embodiment. FIG. 9 indicates regions of continuous refractive index gradients from a minimum refractive index centered on dark area 910 to a maximum refractive index indicated by dark area 930, with intermediate values in the light area 920 between. FIG. 10A through FIG. 10C are block diagrams that illustrate example light propagation through optical device 900, according to various embodiments. Light propagating through the devices are indicated by dark crests 1014, 1024 and 1034, respectively. These figures show that light propagation varies with angle of incidence. FIG. 10A indicates light propagation for normal (perpendicular) incidence; FIG. 10B and FIG. 10C for different oblique incidences. The embodiments shown in FIG. 9 and FIG. 10A, FIG. 10B and FIG. 10C illustrate example flat transformation optics Luneburg lens with a flat image plane. A Luneburg lens is known as an aberration free perfect lens. In various embodiments, such a lens has a form factor as a flat rectangular plate or other flat shape, such as a disc.

The illustrated lens 900 has nanocrystals formed therein to define a three dimensional refractive index gradient within to focus light that passes through the lens. In the various embodiments, crystals are formed within the lens so that light (1014, 1024, 1034) passing through the lens is bent or angled at an angle about 0° and about 30° and about 45°, respectively, depending on the direction and position of flow of the light that is initially passed into the lens. Such lenses have important use for wide angle applications.

Figure 11:
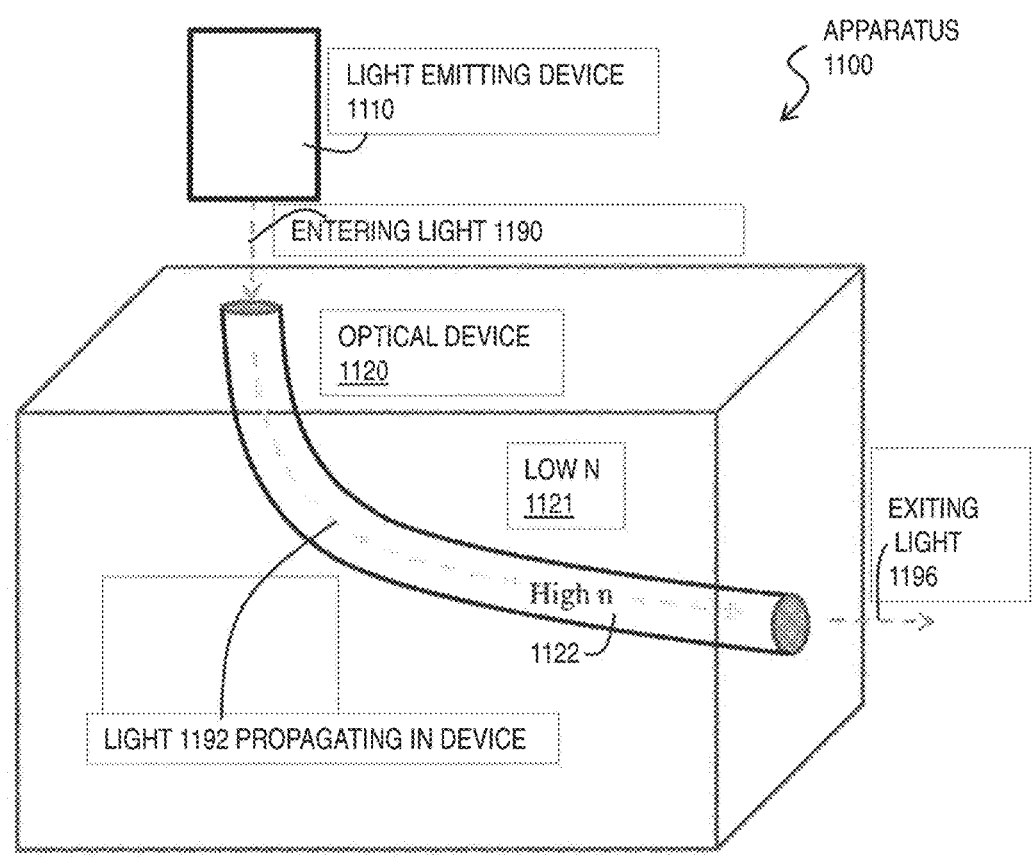
FIG. 11 is a block diagram that illustrates an example optical device formed using the method of FIG. 5, according to still another embodiment.

FIG. 11 is a block diagram that illustrates an example optical device 1120 formed using the method of FIG. 5, according to still another embodiment. This embodiment is an apparatus 1100 that includes a light emitting device 1110 that directs light into an optical device 1120 that has a height (h), a depth (d) and a width (w). The optical device 1120 includes a structure in which nanocrystals are formed to define a refractive index gradient along three different axes: an axis defined by the height (h); an axis defined by the depth (d); and an axis defined by the width (w). The height, depth, and width axes may alternatively be considered x, y, and z axes. The three dimensional (3D) refractive index gradient permits light 1192 that passes through the optical device to be angled or otherwise altered so that it is diffracted by a gradient from low refractive index region 1121 toward the higher refractive index region 1122, between a point at which the light 1190 enters from a fiber or waveguide structure or other structure. In various embodiments, the light is angled such that it follows a curved path, a linear path or a path 1192 that has a linear component and at least one curved component through the optical device. In some embodiments, the path defined by the optical device causes the light 1196 that passes out of the device to enter another waveguide or fiber or to focus at a focal point after passing out of the optical device 1120. In some embodiments, the focal point of the light and the path of the light are defined by the refractive index gradient of the optical device 1120. In the illustrated embodiment, the refractive index gradient of the optical device is defined by the spatial distribution of the density and size of nanocrystals formed within the structure.

In other embodiment, the glass structure is deposited as a layer on a substrate. For example, a GAP-Se glass structure is deposited on a homogeneous material (i.e. AMTIR-5, Silicon, Germanium, etc.) and heated or irradiated to create a GRIN coating. The GRIN coating can be designed, for instance, to correct for spherical aberrations, when deposited onto a spherical homogeneous lens surface; to exhibit an aspherical GRIN profile. This eliminates the need to make aspheric shape lenses, which are difficult to fabricate and require expensive processing such as diamond turning.

In contrast to existing GRIN lens designs and other GRIN optics apparati or GRIN optical devices that must be fabricated on custom curved surface components, embodiments of GRIN lenses created using an embodiment of method 500 can be applied to create flat lenses that are shaped as a cube, plate or disc that has flat surfaces or substantially flat surfaces (e.g. an incline or decline of 0.2 degrees or an incline or decline of 1.0 degrees across a surface) through which light is passed with the same optical functionality. For making such embodiments, melt-quench, sawing, and polishing methods can be used to produce large numbers of identical planar GAP-Se glass components via high-volume manufacturing methods. Planar GAP-Se components with different Ge, As, Pb, and Se compositions could also be made available for creating customized TO-GRIN designs requiring different neff, $\Delta$n, and spatial gradients of n Various embodiments find use in a range of applications beyond those explicitly mentioned above. Optical apparati that would benefit from spatially controlled variation in refractive index include single and multi-element optical systems written into flat glass work pieces, waveguides, diffractive elements, beam steering/beam combining elements, optical filters and other multifunctional structures combining more than one of these functions. In addition, some embodiments extended from the ChG material system into other oxide and halide material systems. Examples of such other oxide and halide material systems are heavy metal oxide or halide glasses (e.g. telluric glasses, fluoride, etc.).

While embodiments have been described with reference to various embodiments, it will be understood by those skilled in the art that various changes, omissions and/or additions may be made and equivalents may be substituted for elements thereof without departing from the spirit and scope of the embodiments. In addition, many modifications may be made to adapt a particular situation or material to the teachings of the embodiments without departing from the scope thereof. Therefore, it is intended that the embodiments not be limited to the particular embodiment disclosed as the best mode contemplated, but that all embodiments falling within the scope of the appended claims are considered. Moreover, unless specifically stated, any use of the terms first, second, etc., does not denote any order or importance, but rather the terms first, second, etc., are used to distinguish one element from another.

What is claimed is:

1. An optical device comprising a single glass structure in which a plurality of nanocrystals has been precipitated in situ in order to produce a spatial gradient of a refractive index in the glass structure.

2. The optical device of claim 1, wherein:
the glass structure is formed from a glass composition that comprises a first chalcogenide chemical component and a second chalcogenide chemical component;
the plurality of nanocrystals comprises the second chalcogenide chemical component and has a different second refractive index from a first refractive index of the first chalcogenide chemical component; and
the plurality of nanocrystals is grown in situ at a corresponding set of a plurality of nucleation sites in order to produce a spatial gradient of a refractive index in the glass structure.

3. The optical device of claim 2, wherein the plurality of nucleation sites are distributed spatially non-uniformly through the glass structure.

4. The optical device of claim 2, wherein a subset of the plurality of nanocrystals are distributed spatially non-uniformly through the structure of the plurality of nucleation sites.

5. The optical device of claim 2, wherein the second chalcogenide chemical component has a higher refractive index than the first chalcogenide chemical component.

6. The optical device of claim 2, wherein the second chalcogenide chemical component has a higher refractive index than the first chemical component by about 0.5 or more.

7. The optical device of claim 2, wherein the first chalcogenide chemical component comprises $As_2Se_3$ and $GeSe_2$.

8. The optical device of claim 7, wherein the second chalcogenide chemical component comprises PbSe.

9. The optical device of claim 2, wherein the first chalcogenide chemical component comprises $Sb_2S_3$ and $GeS_2$.

10. The optical device of claim 9, wherein the second chalcogenide chemical component comprises PbS.

11. The optical device of claim 1, wherein the glass structure is deposited in a layer on a substrate.

12. The optical device of claim 1, wherein the glass structure does not include an organic polymer.

13. The optical device of claim 1, wherein the glass structure and each nanocrystal of the plurality of nanocrystals are transparent to infrared radiation.

14. The optical device of claim 1, wherein the spatial gradient of the refractive index in the glass structure is a two dimensional spatial gradient of the refractive index.

15. The optical device of claim 1, wherein the spatial gradient of the refractive index in the glass structure is a three dimensional spatial gradient of the refractive index.

16. The optical device of claim 1, wherein the plurality of nanocrystals has different sizes in a size range from 10 nanometers to 250 nanometers.

17. The optical device of claim 1, wherein the plurality of nanocrystals has uniform sizes in a size range from 10 nanometers to 250 nanometers and non-uniform spatial distribution through the glass structure.

18. The optical device of claim 1 wherein the plurality of nanocrystals has been precipitated in situ via a laser beam.

19. An optical device comprising a single glass structure in which a plurality of nanocrystals has been precipitated in situ in order to produce a spatial gradient of a refractive index in the glass structure, wherein:
   the single glass structure is formed from a glass composition that comprises a first chalcogenide chemical component and a second chalcogenide chemical component;
   the plurality of nanocrystals comprises the second chalcogenide chemical component and has a different second refractive index from a first refractive index of the first chalcogenide chemical component; and
   the plurality of nanocrystals is grown in situ at a corresponding set of a plurality of nucleation sites in order to produce a spatial gradient of a refractive index in the glass structure.

* * * * *